(12) United States Patent
Hao et al.

(10) Patent No.: US 10,912,290 B2
(45) Date of Patent: Feb. 9, 2021

(54) MAGNETIC DAMPING MECHANISM OF A FISHING REEL

(71) Applicant: NINGBO HAIBO GROUP CO., LTD, Zhejiang (CN)

(72) Inventors: Chongchong Hao, Zhejiang (CN); Junbo Qiu, Zhejiang (CN); Weijun Xu, Zhejiang (CN); Binfeng Xu, Zhejiang (CN); Lihong Ge, Zhejiang (CN); Jialei Ni, Zhejiang (CN)

(73) Assignee: NINGBO HAIBO GROUP CO., LTD, Zhejiang (CN)

( * ) Notice: Subject to any disclaimer, the term of this patent is extended or adjusted under 35 U.S.C. 154(b) by 12 days.

(21) Appl. No.: 16/528,639

(22) Filed: Aug. 1, 2019

(65) Prior Publication Data
US 2020/0037591 A1 Feb. 6, 2020

(30) Foreign Application Priority Data
Aug. 1, 2018 (CN) ...................... 2018 2 1232874 U (51) Int. Cl.
*A01K 89/01* (2006.01)
*A01K 89/0155* (2006.01)

(52) U.S. Cl.
CPC .............................. *A01K 89/01555* (2013.01)

(58) Field of Classification Search
CPC .................... A01K 89/01555; A01K 89/01557
See application file for complete search history.

(56) References Cited

U.S. PATENT DOCUMENTS

| | | | | |
|---|---|---|---|---|
| 4,580,742 A * | 4/1986 | Moosberg | ........ | A01K 89/01555 242/288 |
| 4,593,866 A * | 6/1986 | Moosberg | ........ | A01K 89/01555 242/288 |
| 4,807,828 A * | 2/1989 | Yamaguchi | ...... | A01K 89/01555 242/223 |
| 5,692,693 A * | 12/1997 | Yamaguchi | ...... | A01K 89/01555 242/288 |
| 6,206,311 B1 * | 3/2001 | Kim | ................. | A01K 89/01555 242/288 |
| 6,398,141 B1 * | 6/2002 | Kim | .................. | A01K 89/0155 242/289 |

(Continued)

FOREIGN PATENT DOCUMENTS

CN 107926880 4/2018

*Primary Examiner* — Emmanuel M Marcelo
(74) *Attorney, Agent, or Firm* — JCIP Global Inc.

(57) ABSTRACT

The present invention discloses a magnetic damping mechanism of a fishing reel, including a carrier having a magnet, a damping disc disposed on reel shaft and being rotatable together with the reel shaft, an adjustment knob partially exposed out of the side cover, a driving member engaged with the adjustment knob, and a base connected to the driving member. The base has a through hole for receiving the damping disc; a main spring, which enables the rocker arm to always have a trend to rotate away from the damping disc, is disposed on the base. When the magnetic lines are cut and the induced current is generated when the damping disc rotates together with the reel, the rocker arm is drawn close to the damping disc in the axial direction, to generate a greater damping force. That is, the faster the reel rotates, the more the rocker arm is drawn.

20 Claims, 11 Drawing Sheets

(56) References Cited

U.S. PATENT DOCUMENTS

| | | | |
|---|---|---|---|
| 2004/0159731 A1* | 8/2004 | Moosberg | A01K 89/01555 242/288 |
| 2004/0182961 A1* | 9/2004 | Moosberg | A01K 89/01555 242/288 |
| 2006/0169813 A1* | 8/2006 | Nakagawa | A01K 89/01555 242/288 |
| 2007/0108330 A1* | 5/2007 | Ikuta | A01K 89/01555 242/288 |

* cited by examiner

MAGNETIC DAMPING MECHANISM OF A FISHING REEL

CROSS-REFERENCE TO RELATED APPLICATION

This application claims the priority benefit of China application serial no. 201821232874.X, filed on Aug. 1, 2018. The entirety of the above-mentioned patent application is hereby incorporated by reference herein and made a part of this specification

FIELD OF THE INVENTION

The present invention relates to the technical field of fishing reels and in particular to a magnetic damping mechanism of a fishing reel.

DESCRIPTION OF THE PRIOR ART

To prevent breakage of the fishing line due to too fast rotation of the reel during casting, a damping mechanism is usually provided in the existing fishing reels. The damping mechanism is generally implemented by a centrifugal friction damper, a magnetic damper or an electronic damper or the like. In order to meet the requirements of users, the damping mechanism also has coarse and fine adjustment functions. For example, Chinese Patent CN107926880A disclosed such a magnetic damping mechanism having coarse and fine adjustment functions. This magnetic damping mechanism comprises a damping holder, a drum having a magnet, a damping disc fitted with the magnet, and an adjustment knob exposed from the side cover of a jigging reel. The drum is supported on the damping holder and thus can move in the axial direction. The damping disc is sleeved on a reel shaft and can rotate together with the reel shaft. Multiple grooves of different depths are formed on an end surface of the damping disc, and a pin shaft secured on the reel shaft can be inserted to any one of the grooves. A first spring, which is resisted against the other end surface of the damping disc, is sleeved on the reel shaft so that the damping disc can be resisted against the pin shaft after moving along the reel shaft in the axial direction. Also, a driving member is provided, which is fitted with the adjustment knob and can drive the drum to move in the axial direction, so that the magnet moves away from or close to the damping disc. That is, by this novel damping structure, it is able to change the axial position of the damping disc by the fitting of the pin shaft with the grooves of different depths, and also change the axial position of the drum by means of the adjustment knob and the driving member, further to change the relative distance between the damping disc and the magnet, in order to realize the coarse and fine adjustment functions, and finally to precisely determine the size of the desired damping force. Accordingly, the casting brake force of the fishing reel is matched with the throwing speed of bait, the casting is smoother, the distance of casting is farther, and the requirements of users can be met better.

SUMMARY OF THE INVENTION

A technical problem to be solved in the present invention is to provide, in view of the state in the prior art, a magnetic damping mechanism of a fishing reel, the damping force of which can be controlled more precisely.

To solve the technical problem, the present invention employs the following technical solution. A magnetic damping mechanism of a fishing reel is provided. The fishing reel comprises a main body, a reel shaft rotatably disposed on the main body supported by a bearing, a reel disposed on the reel shaft and being rotatable together with the reel shaft, and a side cover. The magnetic damping mechanism being adjacent to the reel comprises a carrier having a magnet, a damping disc disposed on reel shaft and being rotatable together with the reel shaft, an adjustment knob partially exposed out of the side cover, a driving member engaged with the adjustment knob; and, a base connected to the driving member. Wherein the magnet has a magnetic damping to the damping disc; the driving member drives the carrier to move along the axis of the reel shaft under the driven of the adjustment knob, so as to make the magnet on the carrier to move away from or close to the damping disc, the carrier is a rocker arm with a deflecting shaft which is disposed on the base rotatable relative to the base around the deflecting shaft; the base has a through hole for receiving the damping disc; a main spring, which enables the rocker arm to always have a trend to rotate away from the damping disc, is disposed on the base.

In this solution, the main spring can be a torsional spring, a compression spring or a tension spring, as long as it enables the rocker arm to always have a trend to rotate outward.

In order to further improve the convenience in both the adjustment of damping force and the machining, the damping disc is sleeved on the reel shaft through a damping support. Multiple grooves of different depths are formed on a side surface of the damping support, and a pin shaft secured on the reel shaft is inserted to any one of the grooves. A first spring, which is resisted against the other end surface of the damping support, is sleeved on the reel shaft so that the damping disc and the damping support is resisted against the pin shaft after moving along the reel shaft in the axial direction.

Preferably, the driving member has the following structure. The driving member comprises a first driving member and a second driving member. The first driving member is connected to the adjustment knob. An annular ring having an end surface ascending spirally and an annular groove having a bottom descending spirally is formed on opposite end surfaces of the first driving member and the second driving member, the annular ring and the annular groove are fitted with each other. A connecting post, which is connected to the base, is extended from the second driving member. And, a second spring, by which the second driving member and the first driving member are always meshed with each other, is sleeved on the connecting post.

In order to move the carrier stably, preferably, the base is a damping lid, the connecting post passes through the damping holder to be connected to the damping lid, the rocker arm and the magnet are located in a space formed by the damping lid and the damping holder, and the damping holder is secured to the side cover.

The structure of the driving member is not limited to the form of the first driving member and the second driving member. Other axial pushing methods in the prior art can also be used. In this case, the base is still preferably a damping lid having the through hole in the middle portion; or the base is preferably a drum having a U-shaped cross section and an opening facing the damping disc, with the through hole being formed at the opening of the drum. The deflecting shaft is disposed on the bottom of the drum. The rocker arm and the magnet are disposed inside the drum and distributed on the bottom of the drum. In this way, the rocker arm swings along the bottom of the drum. This further facilitates the stability of motion of the rocker arm when it is assembled.

When the base is designed as a drum, preferably, the drum is disposed inside the damping holder. The damping hole is secured to the side cover. A connecting post, which passes through the damping hole to be connected to the drum, is arranged on the driving member. In this way, by taking the damping holder as guidance, the drum will not incline during the motion. The stability of the rocker arm during the swinging is further improved.

In order to overcome the suspension of the other end of the rocker arm, a spring seat is disposed at an inside position, corresponding to the other end of the rocker arm, on the bottom of the drum. The main spring is a compression spring having two ends respectively connected to the other end of the rocker arm and the spring seat. In this way, due to the returning force of the compression spring, the other end of the rocker arm is supported and the rocker arm swings stably. Particularly, since a compression spring is used as the main spring, the change in elasticity is slow and the service life is long. The self-adaptive adjustment of the damping force can be realized more easily.

To prevent the rocker arm from damaging the outer wall of the damping disc and the inner wall of the drum during its swinging, a limiting block, which is fitted with the other end of the rocker arm, is further disposed on the inner wall of the drum. The movement of the other end of the rocker arm is limited between the limiting block and the spring seat.

To better facilitate the stability of the rocker arm during the swinging, an annular cover plate is secured at the opening of the drum. An inner hole on the annular cover plate is the through hole, so that a chamber which can accommodate the rocker arm is formed between the drum and the annular cover plate. When the rocker arm swings in the chamber, the inner wall of the chamber supports and guides the rocker arm. Furthermore, to reduce the friction generated when the rocker arm swings, a first bump in contact with the annular cover plate and a second bump in contact with the bottom of the drum are disposed at the other end of the rocker arm in order to reduce the contact area.

When the base is designed as the drum, the driving member can be still designed in the above structure. However, the second spring is placed at a different position. That is, the driving member comprises a first driving member and a second driving member. The first driving member is connected to the adjustment knob. an annular ring having an end surface ascending spirally and an annular groove having a bottom descending spirally is formed on opposite end surfaces of the first driving member and the second driving member, the annular ring and the annular groove are fitted with each other; a connecting post, which is connected to the base, is extended from the second driving member; and, a second spring, by which the second driving member and the first driving member are always meshed with each other, is sleeved on the connecting post. Since the middle portions of both the damping holder and the second driving member are stressed, the return effect is better and the stability of the drum can be improved.

When the second spring is resisted against the middle portion of the damping holder and the second driving member, the base can be a damping lid having the through hole in the middle portion, and the rocker arm and the magnet are located in a space formed by the damping lid and the damping holder.

In the solutions, preferably, multiple rocker arms are evenly distributed on the base along the peripheral direction in order to provide more magnets and thus to provide a sufficient damping force.

To obtain a sufficient magnetic force, multiple magnets, which are distributed at intervals, can be provided on each of the rocker arms. The magnets on a same rocker arm are successively arranged, at an end facing the damping disc, in terms of polarity N, S, N, S or S, N, S, N. It is preferred to provide an even number of pairs of rocker arms. The corresponding magnets on two symmetric rocker arms are arranged, at an end facing the damping disc, in opposite polarity. In this way, the distribution of magnetic lines is good and the magnetic force is even, and the rotation of the reel is more stable.

Compared with the prior art, since the magnets in the present invention are secured on the rocker arm, when the magnetic lines are cut and the induced current is generated when the damping disc rotates together with the reel, the rocker arm is drawn close to the damping disc in the axial direction, to generate a greater damping force. That is, the faster the reel rotates, the more the rocker arm is drawn, and the closer the rocker arm gets to the center of the damping disc. Accordingly, the damping force is greater. Obviously, in addition to the function of externally adjusting the damping force, the present invention has an automatic adjustment function. Therefore, the damping force can be controlled more precisely and the requirements of users can be met better.

DETAILED DESCRIPTION OF THE PREFERRED EMBODIMENT

To enable a further understanding of the present invention content of the invention herein, refer to the detailed description of the invention and the accompanying drawings below.

Embodiment 1

FIGS. 1-5 show a first embodiment of a magnetic damping mechanism of a fishing reel in the present invention.

Figure 1:
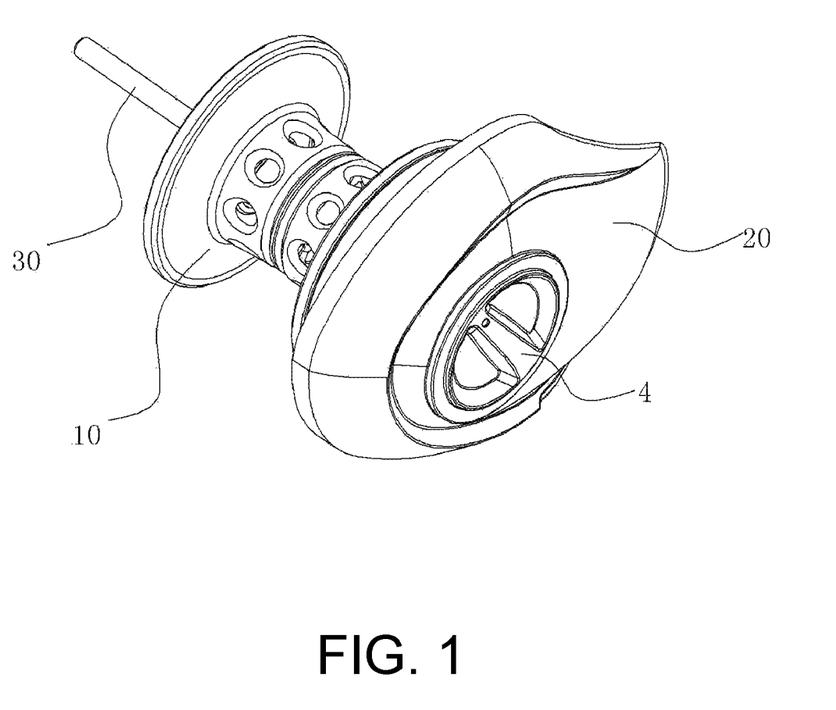
FIG. 1 is a perspective view of a magnetic damping mechanism of a fishing reel according to a first embodiment of the present invention.
Figure 2:
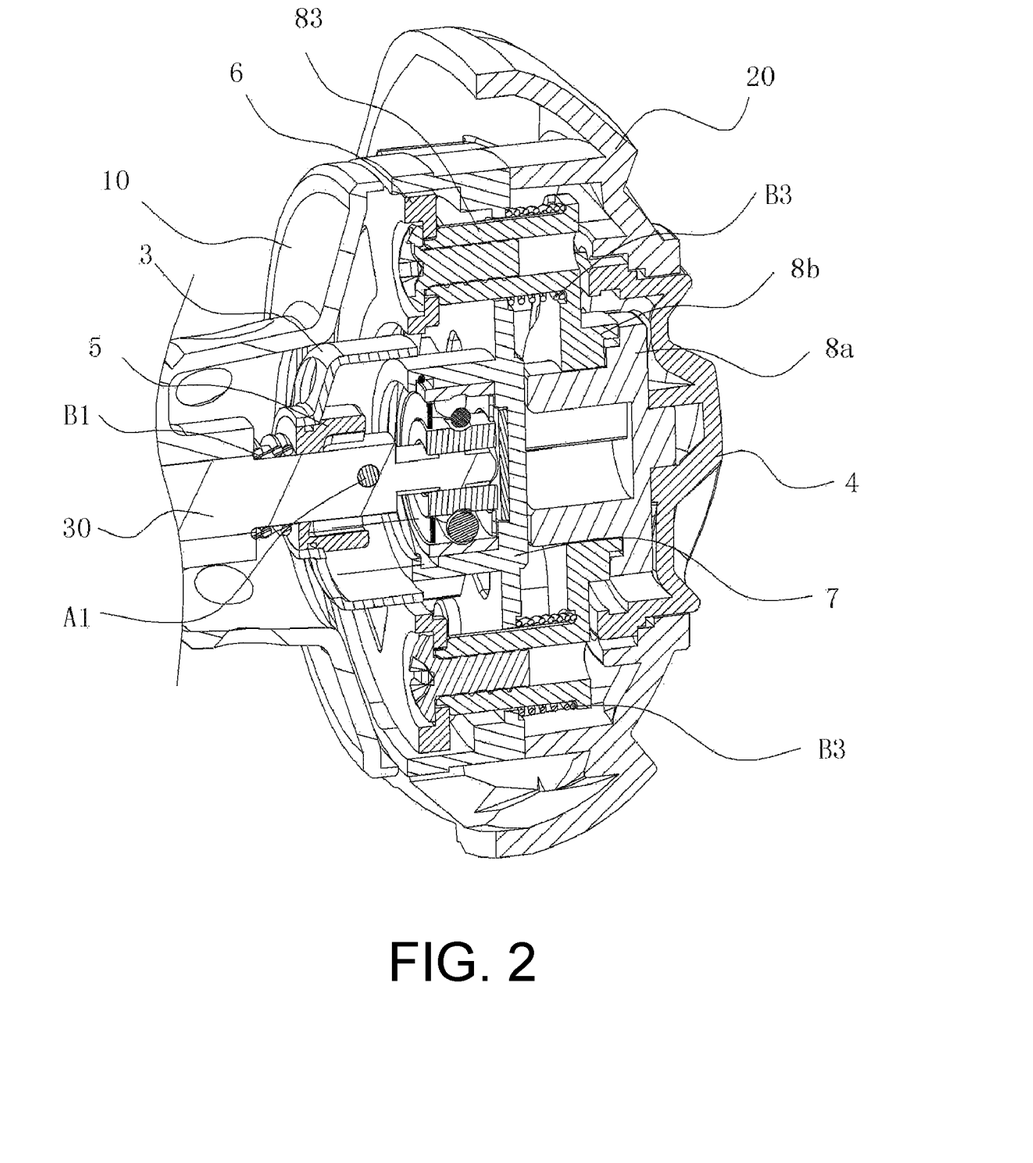
FIG. 2 is a sectional view of the magnetic damping mechanism of a fishing reel according to the first embodiment of the present invention, taken at the connecting post.
Figure 3:
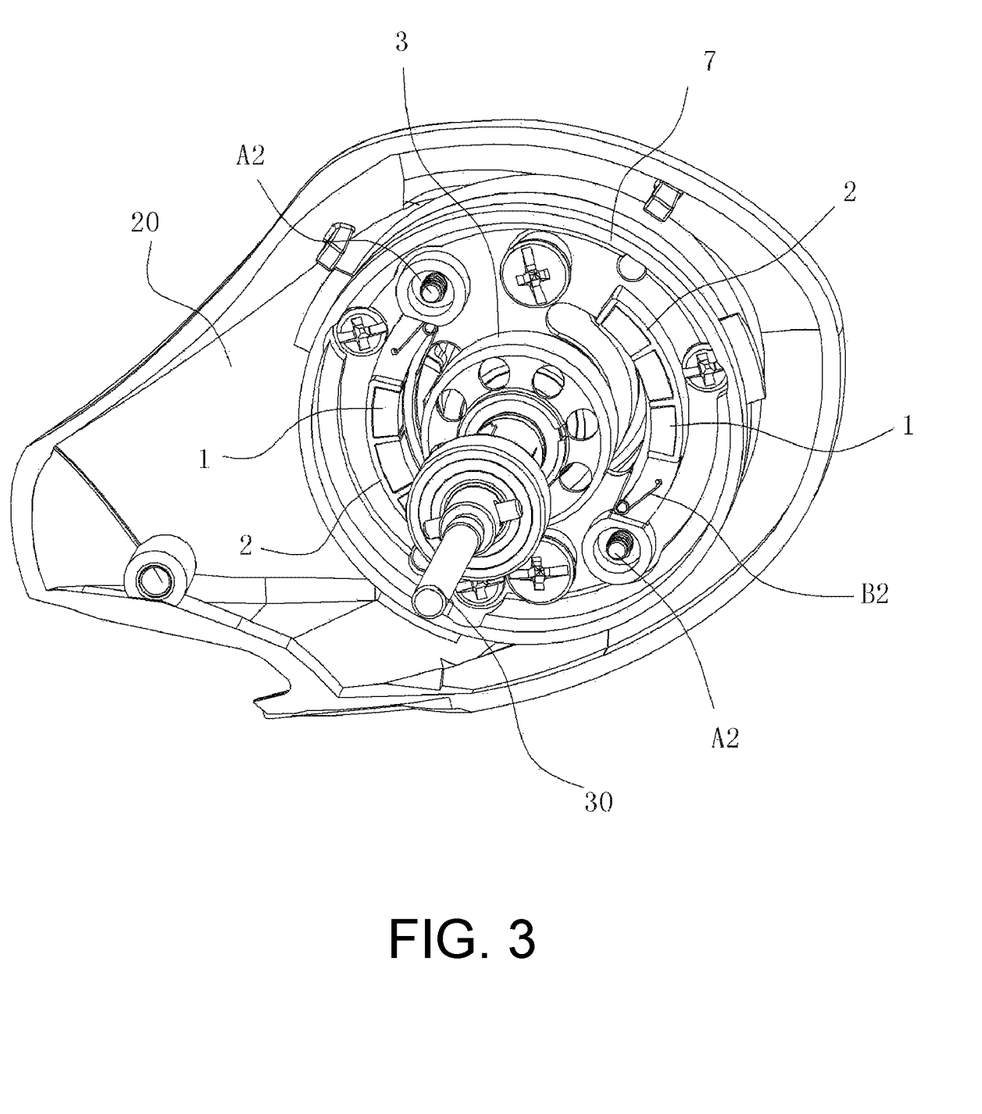
FIG. 3 is a perspective view of FIG. 1, wherein the reel and the damping lid are removed.

As shown in FIG. 1, the fishing reel comprises a main body 40 (not shown), a reel 10 and a side cover 20, wherein the reel 10 is disposed on a reel shaft 30 which is rotatably disposed on the main body 40 by a bearing; the magnetic damping mechanism, which is adjacent to a right side of the reel 10, comprises a carrier 2 having a magnet 1, a damping disc 3 disposed on reel shaft 30 and being rotatable together with the reel shaft 30, an adjustment knob 4 partially exposed out of the side cover 20, a driving member 8 engaged with the adjustment knob 4 and can drive the carrier 2 to move along the axis of the reel shaft 30 under the driven of the adjustment knob 4, so as to make the magnet 1 on the carrier 2 to move away from or close to the damping disc 3. In this embodiment, the damping disc 3 is a drum-shaped and hollow aluminum component. The damping disc 3 is sleeved on a damping support 5 which is then sleeved on the reel shaft 30. That is, the damping disc 3 is sleeved on the reel shaft 30 through the damping support 5. An opening of the damping disc 3 faces the carrier 2 having the magnet 1. A number of pairs (four pairs, in the drawing) of grooves 51 of successively increased depths, which are symmetrical bilaterally, are formed on a side surface of the damping support 5. Left and right ends of a pin shaft A1, which is secured on the reel shaft 30, can be inserted into any one of the pairs of grooves 51. A first spring B1 is sleeved on the reel shaft 30. Two ends of the first spring B1 are respectively resisted against the outer bottom surface of the damping support 5 and the bump on the reel shaft 30, that is, resisted against the other end surface of the damping support 5, so that the damping disc 3 and the damping support 5 can be resisted against the pin shaft A1 after moving rightward along the reel shaft 30 in the axial direction (see FIG. 2), and accordingly, the damping disc 3 can rotate together with the reel shaft 30. With such a split structure of the damping disc 3 and the damping support 5, the manufacture is easy and the machining cost is reduced, with the same effect as that in the prior art. In other words, when adjusting the axial position of the damping disc 3 is needed, by pressing the damping disc 3 leftward in the axial direction and releasing the damping disc 3 after turning it by a certain angle, due to the first spring B1, the damping disc 3 moves rightward, the pin shaft A1 falls into a corresponding deeper or shallower groove 51, in order to change the distance between the damping disc 3 and the magnet 1. That is, the damping force can be coarsely adjusted simply by appropriately selecting a difference in depth of the grooves 51.

The carrier 2 differs from that in the prior art. The carrier 2 is a rocker arm with a deflecting shaft A2 which is disposed on the base 6 rotatable relative to the base 6 around the deflecting shaft A2. The base 6 has a through hole 61 for receiving the damping disc 3. That is, the rocker arm is disposed beside the damping disc 3. To ensure the number of magnets 1, there can be multiple rocker arms which are evenly distributed on the base 6 along the peripheral direction, that is, which are distributed around the damping disc 3. In this embodiment, there are two rocker arms each having three magnets 1 distributed thereon at intervals. The three magnets 1 are arranged in terms of polarity N, S, N or S, N, S. The base 6 is designed as a damping lid which is covered on the damping holder 7 and connected to the driving member 8. Due to the driving member 8, the damping lid can move in relative to the damping holder 7 in the axial direction. The damping holder 7 is secured to the side cover 20 by three bolts. The rocker arms and the magnets 1 are located in a space formed by the damping lid and the damping holder 7. Torsional springs B2, the number of which corresponds to the number of the rocker arms, are disposed on the damping lid. One end of each of the torsional springs B2 is positioned on the damping lid and the other end thereof is inserted in a small hole on the rocker arm, in order to enable each rocker arm to always have a trend to rotate outward.

Figure 4:
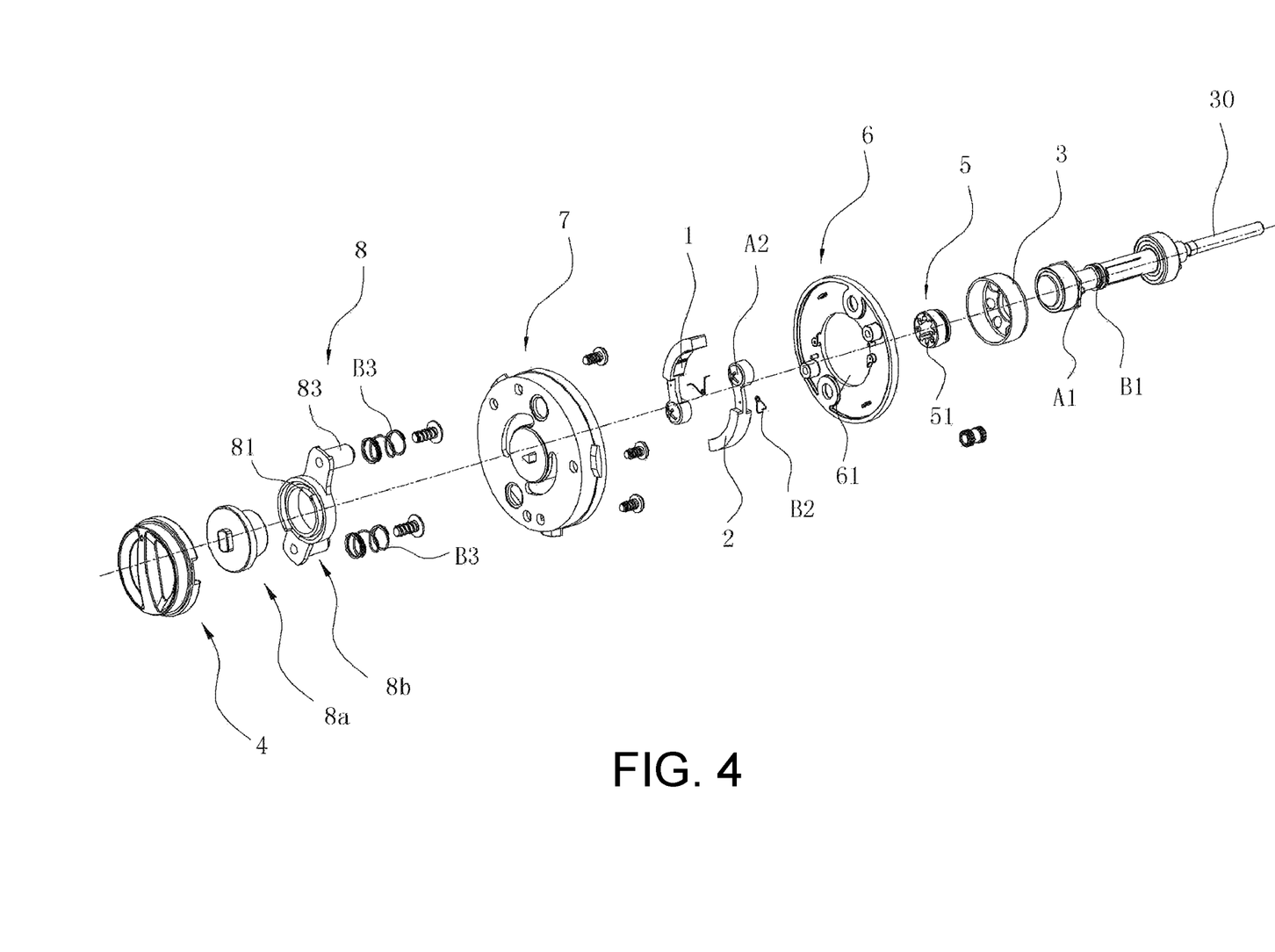
FIG. 4 is an exploded view of FIG. 1, wherein the side cover and the reel are removed.
Figure 5:
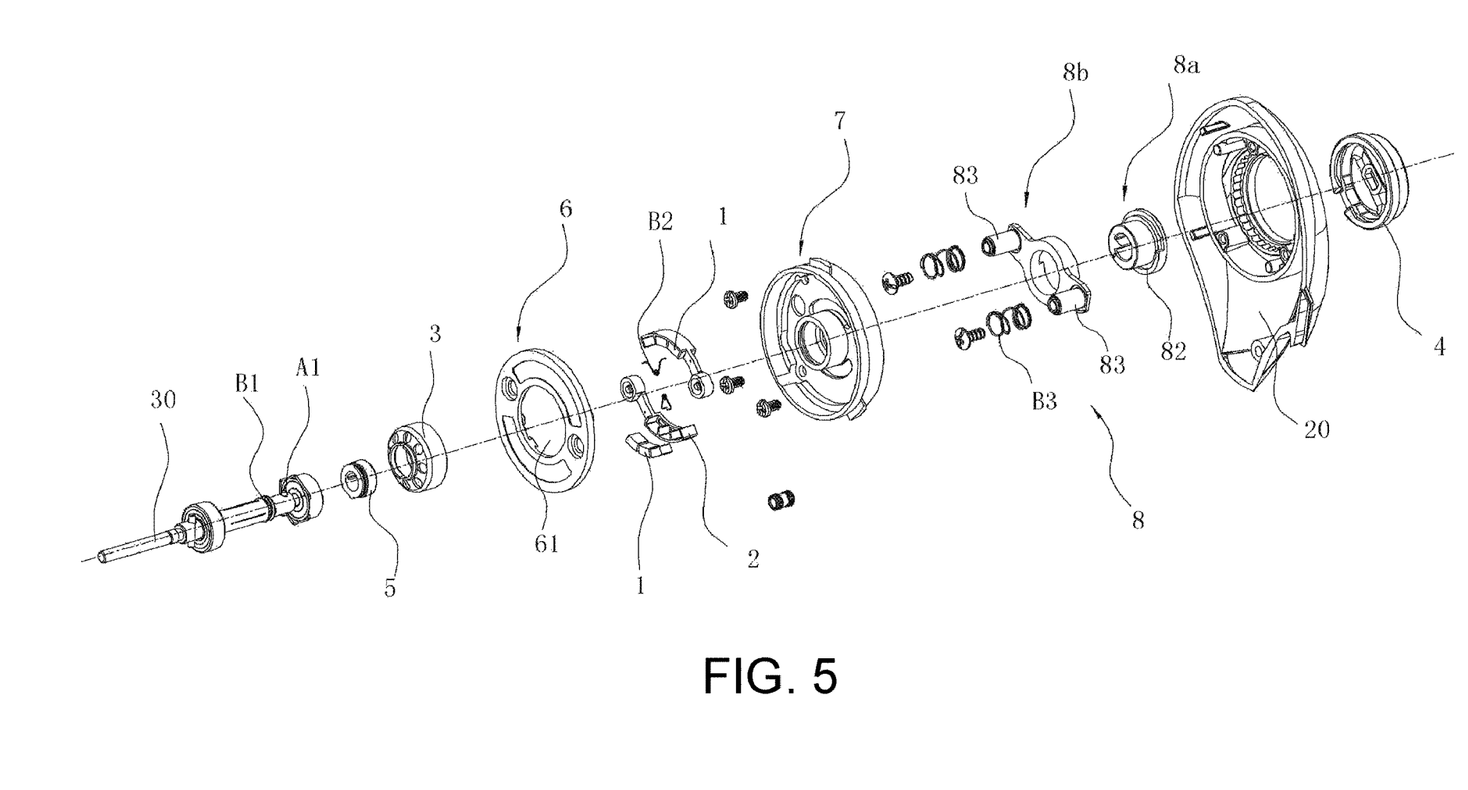
FIG. 5 is an exploded view of FIG. 1 from another direction, wherein the reel is removed.
Figure 6:
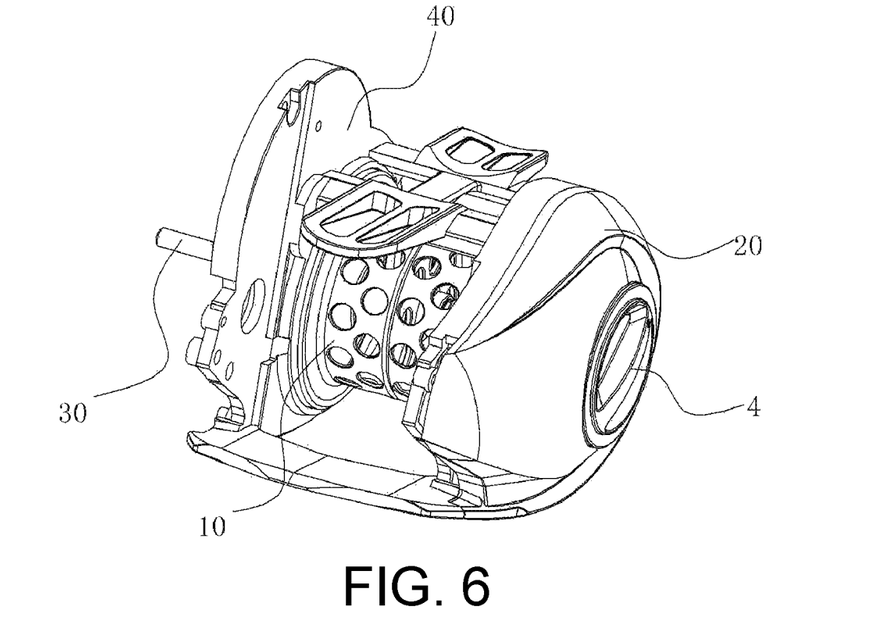
FIG. 6 is a perspective view of a magnetic damping mechanism of a fishing reel according to a second embodiment of the present invention.
Figure 7:
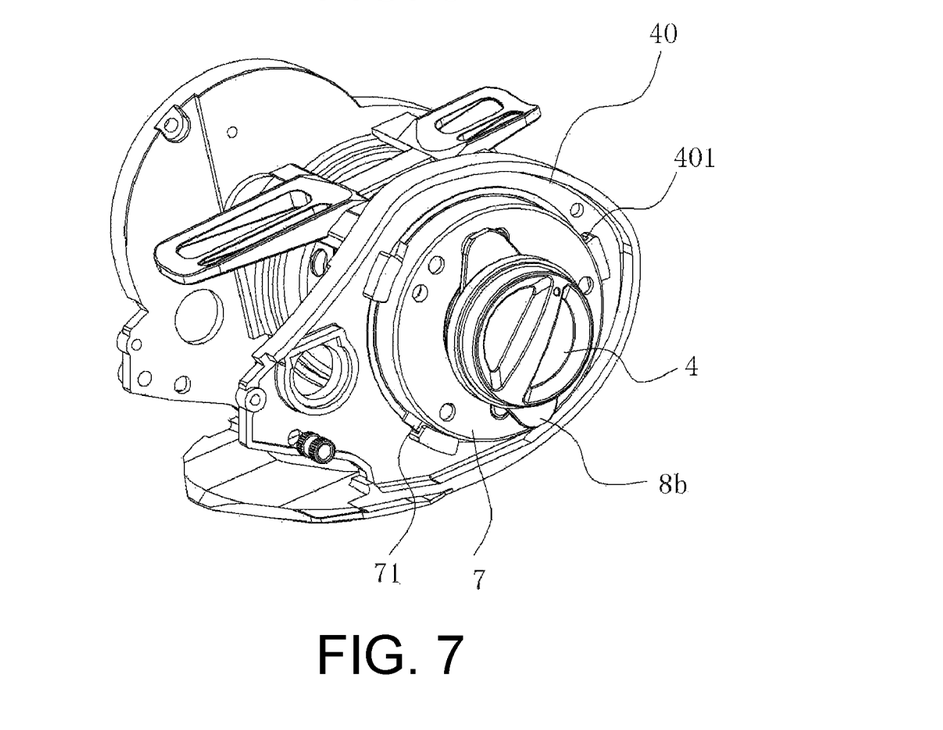
FIG. 7 is a perspective view of FIG. 6, wherein the side cover is removed.

The driving member 8 in this embodiment comprises a first driving member 8a and a second driving member 8b. The first driving member 8a is connected to the adjustment knob 4. An annular ring 81 having an end surface ascending spirally and an annular groove 82 having a bottom descending spirally is formed on opposite end surfaces of the first driving member 8a and the second driving member 8b, the annular ring 81 and the annular groove 82 are fitted with each other. And, two connecting posts, each of which passes through the damping holder 7 to be connected to the damping lid, are extended from the second driving member 8b. A second spring B3, by which the second driving member 8b and the first driving member 8a are always meshed with each other, is sleeved on the connecting post.

When it is needed to finely adjust the damping force, the adjustment knob 4 is rotated, which drives the first driving member 8a to rotate. Then, the first driving member 8a can drive the second driving member 8b to move towards or away from the damping disc 3 (due to the return force of the second spring) in the axial direction by the fitting of the annular ring and the annular groove between the first driving member 8a and the second driving member 8b. In this way, the distance between each magnet 1 and the damping disc 3 can be finely adjusted.

Since the magnets 1 are borne by the rocker arms, on the basis of the coarse and fine adjustment functions, automatic adjustment can be realized in this embodiment. That is, the magnetic lines are cut and the induced current is generated when the damping disc rotates together with the reel 10, and thus the rocker arm is drawn close to the damping disc 3 in the axial direction, to generate a greater damping force. The faster the reel 10 rotates, the more the rocker arm is drawn, and the closer the rocker arm gets to the center of the damping disc 3. Accordingly, the damping force is greater. Once the reel 10 stops rotating, each rocker arm rotates outward due to the respective torsional spring B2 so that each magnet 1 moves away from the damping disc 3. Accordingly, the damping force decreases. Therefore, the fishing reel in this embodiment can automatically adjust the damping force according to the rotation speed of the reel. A more precise damping force can be achieved.

Embodiment 2

FIGS. 6-13 show a second embodiment of a magnetic damping mechanism of a fishing reel in the present invention. The second embodiment differs from the first embodiment in that the base has a different structure and the second spring B3 is placed in a different position, specifically referring to FIGS. 6-13.

Figure 8:
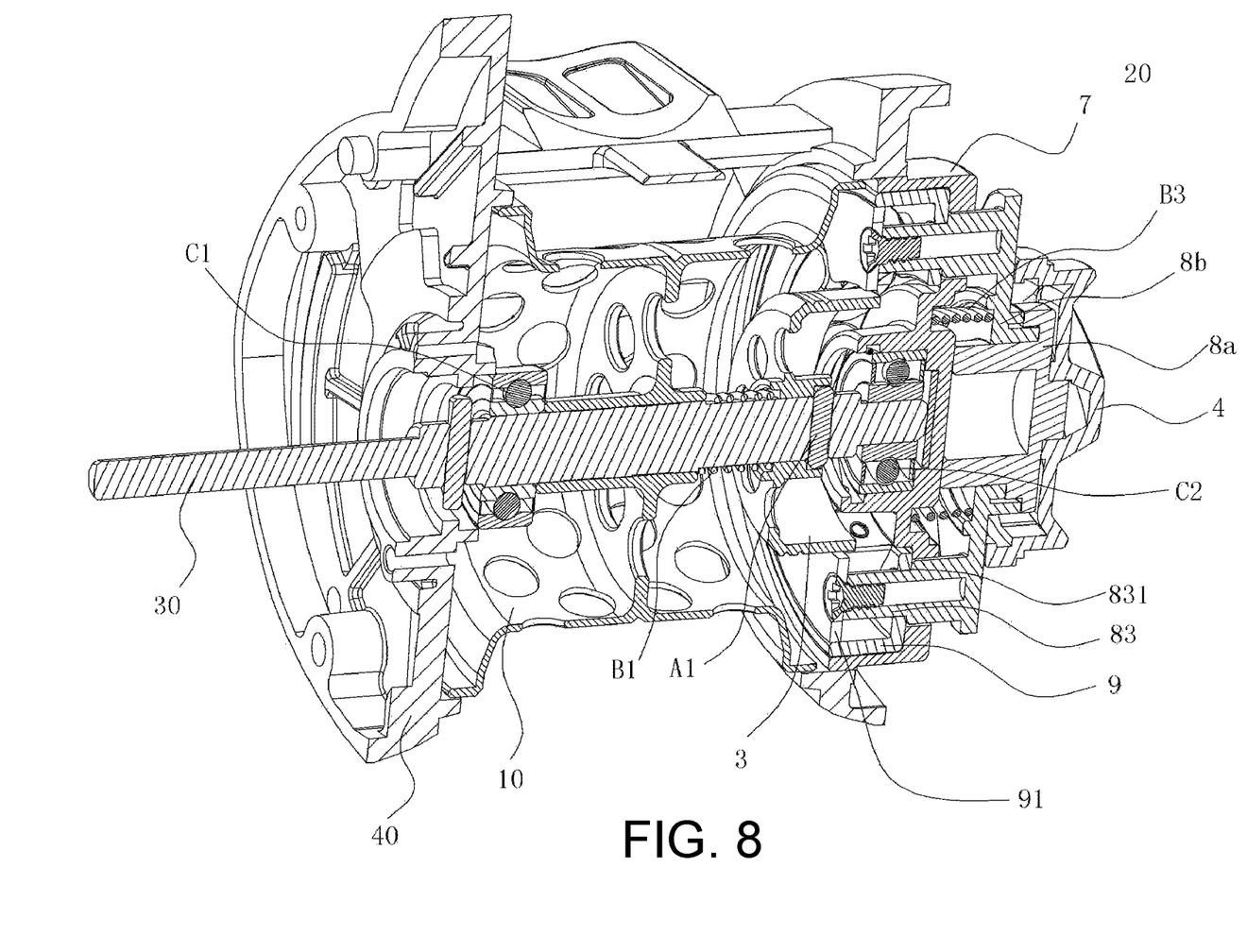
FIG. 8 is a sectional view of FIG. 7, at the position of the connecting post.
Figure 9:
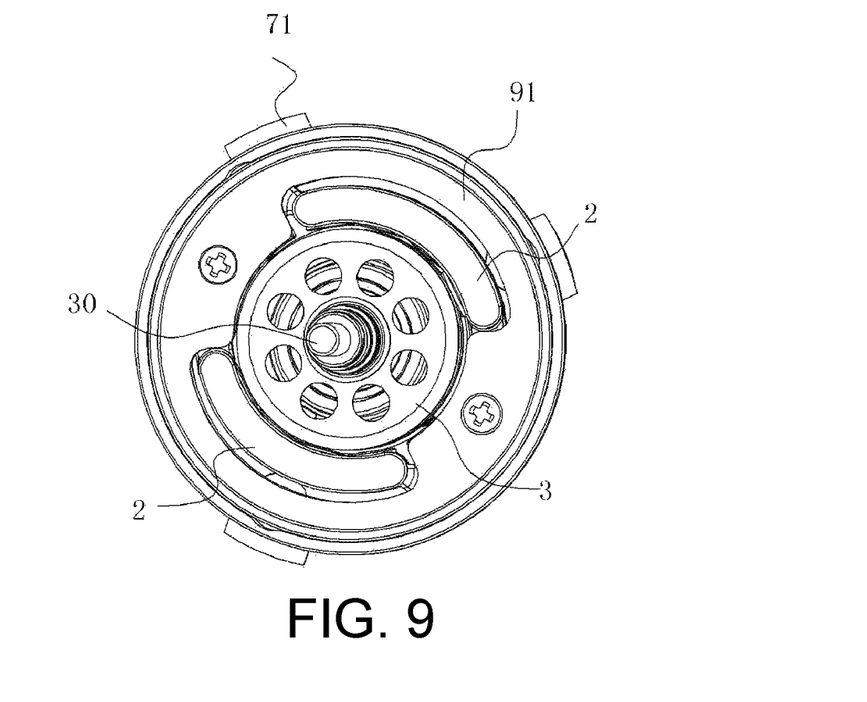
FIG. 9 is a perspective view of FIG. 7, wherein the main body and the reel are removed.
Figure 10:
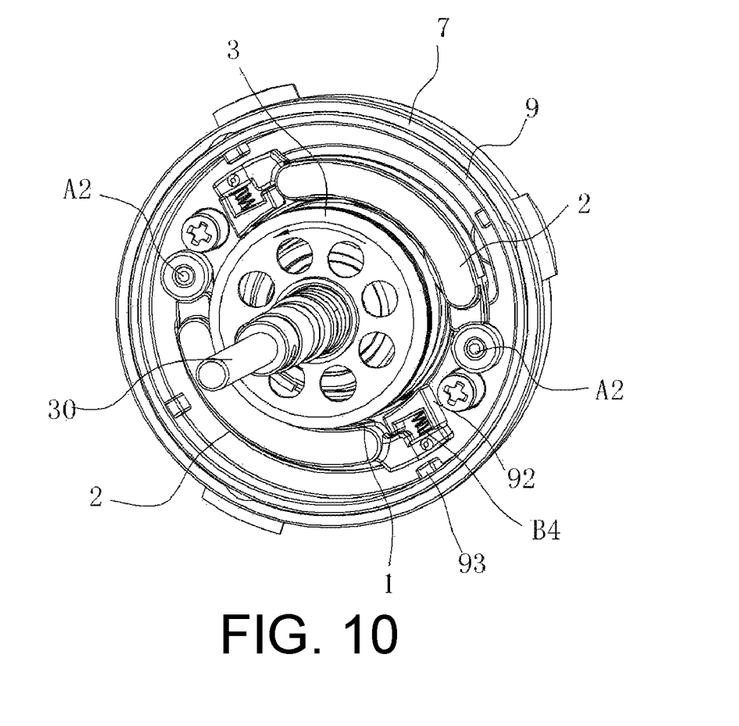
FIG. 10 is a perspective view of FIG. 9, wherein the annular cover plate is removed.

The fishing reel also comprises a main body 40, a reel 10 and a side cover 20, wherein the reel 10 is disposed on a reel shaft 30 which is supported on the main body 40 by a left bearing C1 and a right bearing C2 (as shown in FIG. 8, the left bearing C1 is directly disposed on the main body 40, and the right bearing C2 is disposed on a damping holder 7 which is in turn detachably connected to the main body 40, specifically by the insertion of multiple stoppers 71 on the peripheral surface of the damping holder 7 into multiple slots 401 concentrically distributed on the main body 40, that is, the right bearing C2 is supported on the main body 40 by the damping holder 7), so that the reel 10 can rotate in relative to the main body 40, in order to reel or unreel the fishing line. The magnetic damping mechanism is also located on the right side of the reel 10 (of course, it may be placed on the left side of the reel 10 if desired). The magnetic damping mechanism also comprises a carrier 2 having a magnet 1, a base 6, a damping disc 3 fitted with the magnet 1, an adjustment knob 4, a first driving member 8a, a second driving member 8b, as well as a pin shaft A1, a groove 51 and a first spring B1. Wherein, the damping disc 3 can be a hollow aluminum component, or can be a component made of other metals except metals with a property of magnetic absorption (for example, iron), as long as the induced current can be generated when the magnetic lines are cut. Compared with the first embodiment, the damping disc 3 is integrated with the damping support in this embodiment. The structure of the base is also changed. The change to the base is to ensure that the base can be not prone to inclining, in order to ensure that the mounted rocker arms will not incline. That is, after being mounted or during the motion, the plane of the rocker arms can be in a plane of the vertical axis as much as possible, in order to prevent reel jittering caused by the uneven distribution of magnetic lines generated by the pairs of magnets 1 onto the damping disc 3. Specifically, the base is a drum 9 having a U-shaped cross section and an opening facing the damping disc 3. The drum 9 is located in the damping holder 7 and is in clearance fit with the damping holder 7. That is, when the drum 9 moves in the axial direction, the damping holder 7 can guide it. The through hole is formed at the opening of the drum 9 (this is equivalent to the structure denoted by 61 in the first embodiment). The deflecting shaft A2 is disposed on the bottom of the drum 9. The rocker arm and the magnet 1 are located in the drum 9 and distributed on the bottom of the drum 9. Furthermore, to prevent the rocker arm from damaging the outer wall of the damping disc 3 and the inner wall of the drum 9 during its swinging, as a further improvement, a spring seat 92 is disposed at an inside position, corresponding to the other end of the rocker arm, on the bottom of the drum 9. Two ends of the main spring are respectively connected to the other end of the rocker arm and the spring seat. That is, in this case, the main spring is a compression spring B4 (it can be a torsional spring, and in this case, the spring seat is disposed at an outside position corresponding to the other end of the rocker arm). A limiting block 93, which is fitted with the other end of the rocker arm, is further disposed on the inner wall of the drum 9. In this way, the movement of the other end of the rocker arm is limited between the limiting block 93 and the spring seat 92.

The connecting post 83 on the second driving member 8b passes through the damping holder 7 to be connected to the drum 9. Here, the connection of the connecting post 83 to the drum 9 can be realized by passing a bolt through the bottom of the drum 9 and directly securing the bolt to the connecting post 83, so that the connecting post 83 can move together with the drum 9. Also, as shown in FIG. 8, an annular cover plate 91 is secured at the opening of the drum 9. An inner hole on the annular cover plate 91 is the through hole. There is a step 831 on the connecting post 83. The connecting post 83 passes through the bottom of the drum 9 so that the drum 9 is resisted against the step 831, and then a bolt is passed through the annular cover plate 91 to be directly secured to the connecting post 83 so that the annular cover plate 91, the drum 9 and the connecting post 83 move together. In this case, the drum 9 and the annular cover plate 91 form a chamber for accommodating the rocker arm. In this way, when the rocker arm swings in the chamber, the inner wall of the chamber can support and guide the rocker arm. Accordingly, the other end of the rocker arm (i.e., an end away from the deflecting shaft A2) is prevented from suspending and the rocker arm swings more stably. Furthermore, to reduce the friction generated when the rocker arm swings, a first bump 21 in contact with the annular cover plate 91 and a second bump 22 in contact with the bottom of the drum 9 are provided at the other end of the rocker arm.

To further ensure the stability of the drum 9 during the motion, in this embodiment, the position of the second spring B3 is also changed. That is, two ends of the second spring B3 are resisted between the middle portion of the damping holder 7 and the second driving member 8b, so that the second driving member 8b and the first driving member 8a are always meshed with each other. Furthermore, in this embodiment, a recessed area 72, in which one end of the second spring B3 is located, is formed in the middle portion of an end surface of the damping holder 7 facing the second driving member 8b, so that the second spring B3 is resisted against the damping holder 7 stably. The second spring B3 is moved to the middle position. Compared with the distribution of the second spring B3 in the first embodiment (in the first embodiment, an end of each of two second springs B3 is respectively resisted against two ends of the damping holder 7 and the other end is respectively resisted against the root, corresponding to the connecting post 83, of the second driving member 8b). Since the middle portions of both the damping holder 7 and the second driving member 8b are stressed, the return effect is better and the stability of the drum 9 can be improved.

Figure 11:
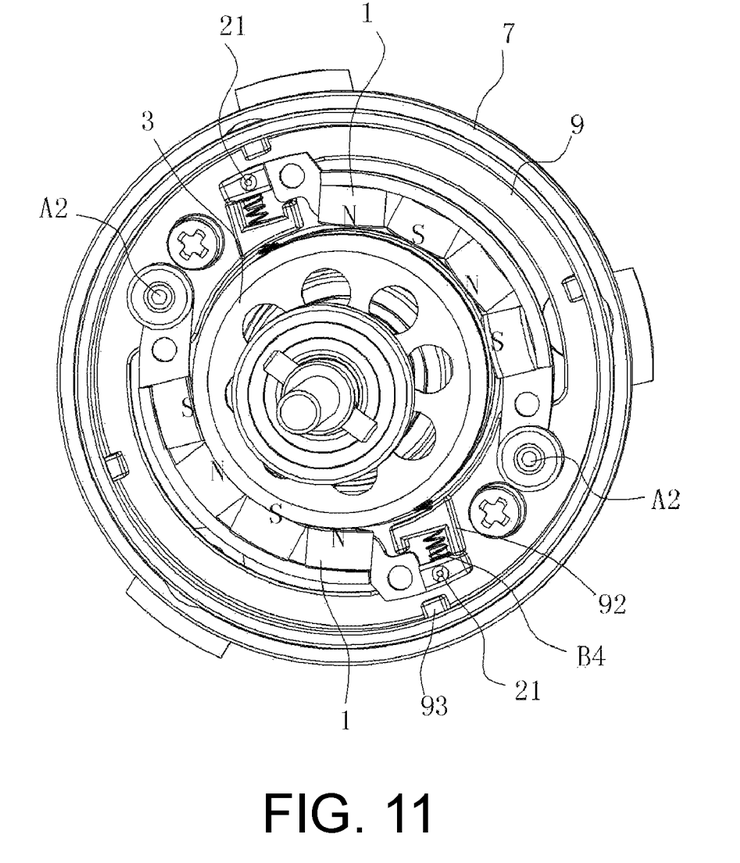
FIG. 11 is a perspective view of FIG. 10, wherein some part of rocker arms are removed.
Figure 12:
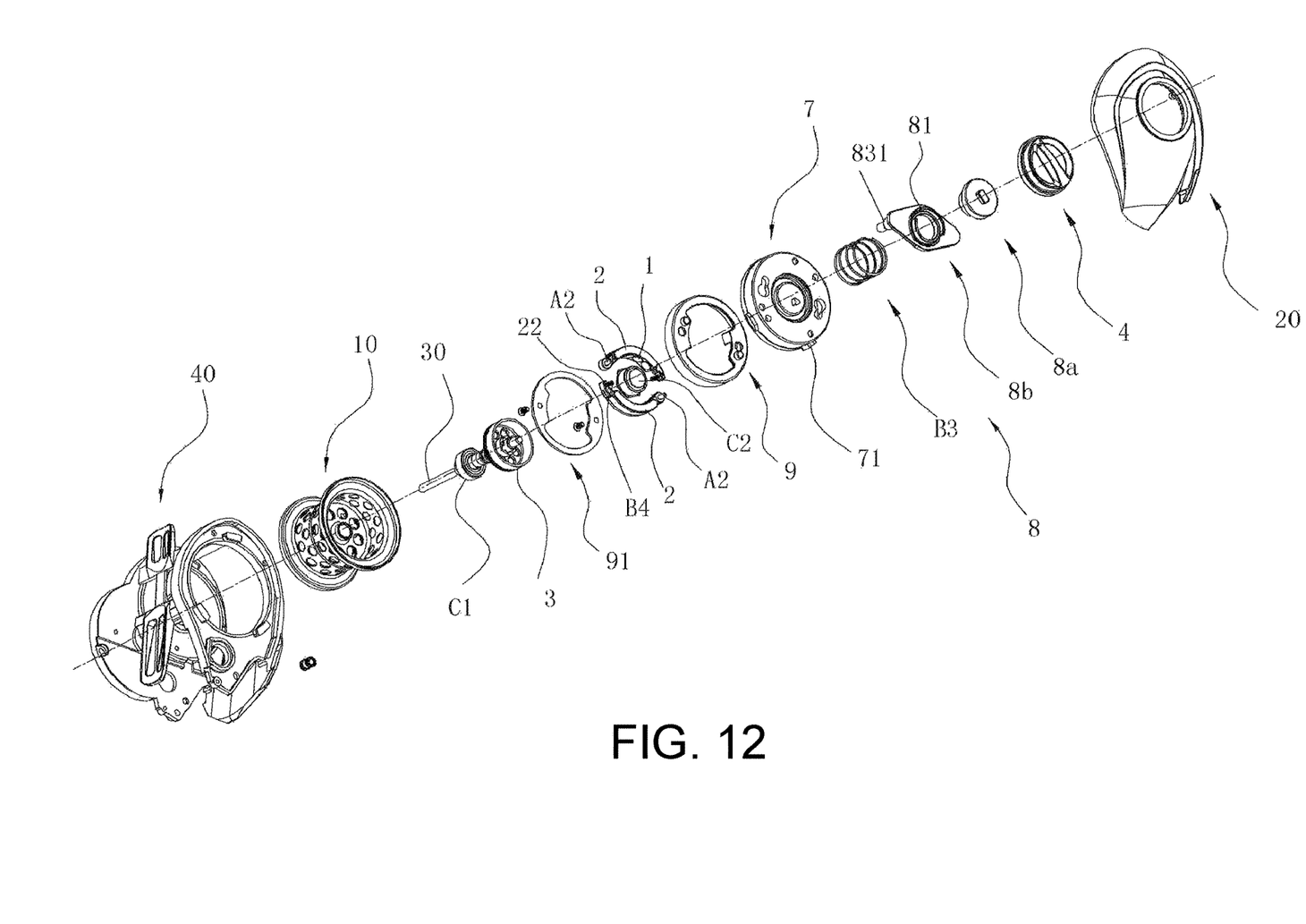
FIG. 12 is a sectional view of FIG. 6.
Figure 13:
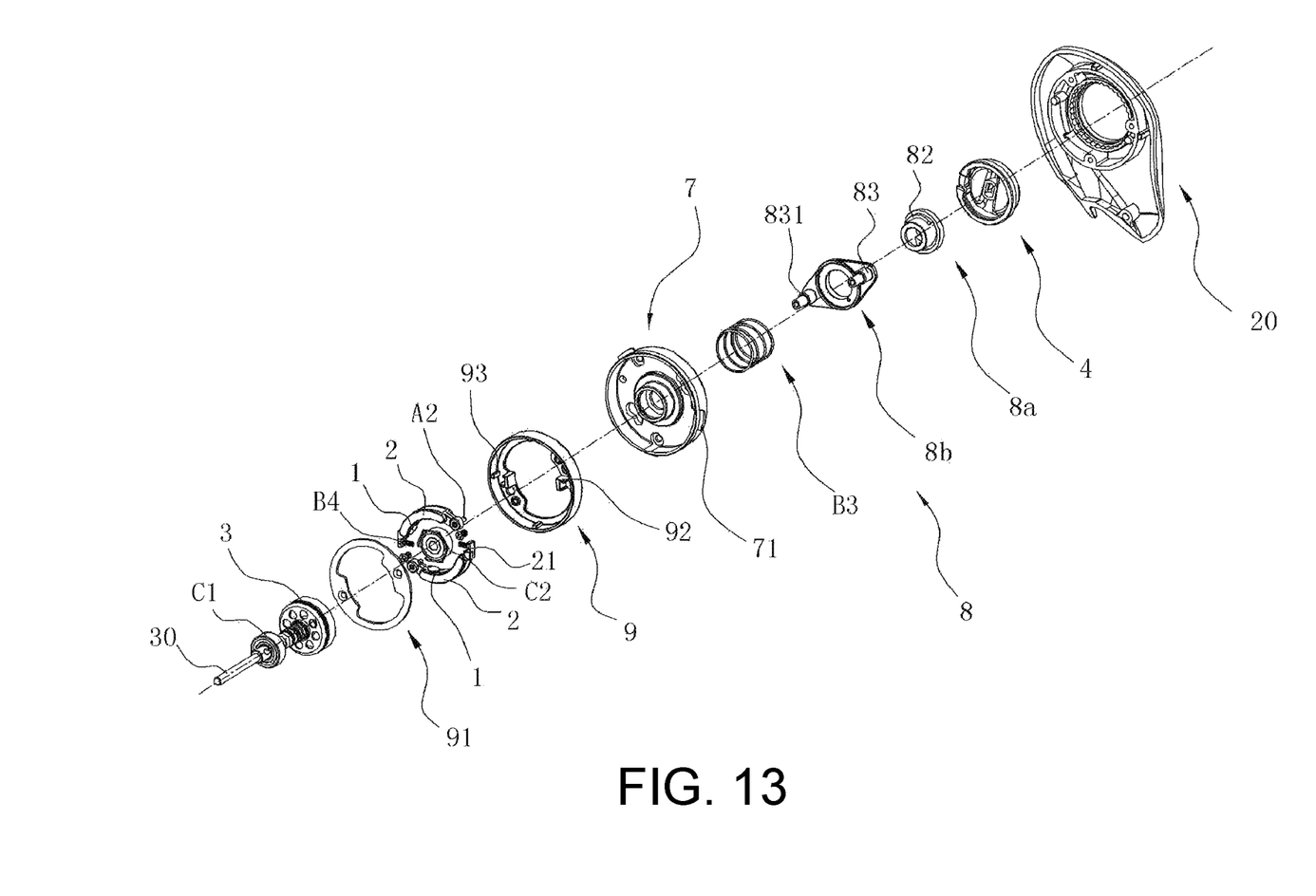
FIG. 13 is a sectional view of FIG. 12 from another direction, wherein the main body and the reel are removed.

In this embodiment, there are also multiple rocker arms which are evenly distributed on the bottom of the drum 9 along the peripheral direction. Here, preferably, there is an even number of pairs of rocker arms each having multiple magnets 1 distributed thereon at intervals. As shown in FIG. 11, there are two rocker arms in total, each having four magnets 1 distributed thereon at intervals. The magnets 1 are preferably designed as cylinders (of course, they can be sheets as in the first embodiment). The magnets 1 on a same rocker arm are arranged, at an end facing the damping disc 3, in terms of polarity N, S, N, S or S, N, S, N. Furthermore, the corresponding magnets 1 on two symmetric rocker arms are arranged, at an end facing the damping disc 3, in opposite polarity, i.e., arranged as shown in FIG. 11.

Also, when it is needed to finely adjust the damping force, the adjustment knob 4 is rotated (the adjustment knob is turned during the mounting of the side cover 10 as normal). By the fitting of the first driving member 8a with the second driving member 8b, through the connecting post 83, the drum 9 and the annular cover plate 91 move towards the damping disc 3. Or, when the adjustment knob 4 is rotated in a reverse direction, due to the return force of the second spring B3, each magnet 1 can move away from the damping disc 3. In this way, the distance between each magnet 1 and the damping disc 3 can be finely adjusted.

When it is needed to coarsely adjust the damping force, the side cover 20 can be rotated and the damping holder 7 is driven to rotate. In this case, the stoppers 71 (three, in the drawing) on the peripheral surface of the damping holder 7 separate from the corresponding slot 401 on the main body 40, so that the side cover assembly (that is, the side cover comprises the adjustment knob 4, the first driving member 8a, the second driving member 8b, the second spring B3, the damping holder 7, the drum 9, the annular cover plate 91, the rocker arm and the magnet 1 and the like) separates from the main body 40 to expose the damping disc 3. Then, according to the adjustment method described in the first embodiment, by pressing the damping disc 3 leftward in the axial direction and releasing the damping disc 3 after turning it by a certain angle, due to the first spring B1, the damping disc 3 moves rightward, the pin shaft A1 falls into a corresponding deeper or shallower groove 51, in order to change the distance between the damping disc 3 and the magnet 1. That is, the damping force can be coarsely adjusted simply by appropriately selecting a difference in depth of the grooves 51.

Also, when the damping disc 3 starts rotating as the reel 10 unreels the fishing line (rotates counterclockwise as indicated by an arrow in FIG. 10), the magnetic lines generated by the magnets 1 are cut and the induced current is generated, thus the rocker arm is drawn close to the damping disc 3 in the axial direction in the drum 9 (that is, close to the axis). For the damping disc 3, the denser the magnetic lines are, the greater the damping force is. When the reel 10 rotates faster, the induced current on the damping disc becomes greater, and the resulting magnetic field better draw the magnets. Thus, the rocker arm may get closer to the center of the damping disc 3 against the elasticity of the compression spring B4, until it is resisted against the spring seat 92, which has a greatest damping force at this moment. Once the reel 10 becomes slower or stops rotating, each rocker arm rotates outward due to the respective compression spring B4 so that each magnet 1 moves away from the damping disc 3 along the radial direction. Accordingly, the damping force decreases, until the rocker arm is resisted against the limiting block 93. As a result, the fishing reel in this embodiment can automatically adjust the damping force according to the unreeling rotation speed of the reel. A more precise damping force can be achieved. Furthermore, the magnetic lines generated by the magnets are evenly distributed on the damping disc, and the reel rotates more smoothly.

When the damping disc 3 starts rotating as the reel 10 reels (rotates in a reverse direction as indicated by the arrow in FIG. 10), the magnetic lines generated by the magnets 1 are cut and the induced current is generated. However, in this case, the resulting magnetic field repels the corresponding magnets. That is, the magnetic force is in a same direction as the return force of the compression spring. The rocker arms will not be drawn. Thus, the reeling can be done smoothly without great resistance.

In addition to the first and second embodiments, the present invention may have a third embodiment. In the first embodiment, when the second spring is sleeved on the connecting post, the damping lid is replaced with the drum in the second embodiment, or the damping lid is replaced with the combined component of the drum and the annular cover plate.

The present invention may have a fourth embodiment. In the second embodiment, when the second spring is located between the damping holder and the second driving member, the drum is replaced with the damping lid in the first embodiment The present invention may have a fifth embodiment. In the embodiments, when the base is designed as a damping lid, a guide wall may be extended from the edge of the damping lid, which may be inserted in the damping holder so that the damping lid becomes more stable during the axial motion.

Or, the present invention may have a sixth embodiment. The existing other fine and coarse damping force adjustment structures are used, and the damping lid or drum is still used as the base. That is, any modifications, equivalent replacements and improvements made within the spirit and principle of the present invention shall be included in the protection scope of the present invention.

What is claimed is:

1. A magnetic damping mechanism of a fishing reel, wherein the fishing reel comprises:
   a main body;
   a reel shaft rotatably disposed on the main body supported by a bearing;
   a reel disposed on the reel shaft and being rotatable together with the reel shaft; and
   a side cover;
   wherein the magnetic damping mechanism is adjacent to the reel, comprising
   a carrier having a magnet;
   a damping disc disposed on reel shaft and being rotatable together with the reel shaft;
   an adjustment knob partially exposed out of the side cover;
   a driving member engaged with the adjustment knob; and,
   a base connected to the driving member,
   wherein
   the magnet has a magnetic damping to the damping disc;
   the driving member driven by the adjustment knob drives the carrier to move along the axis of the reel shaft, so as to make the magnet on the carrier to move away from or close to the damping disc,
   the carrier is a rocker arm with a deflecting shaft which is disposed on the base rotatable relative to the base around the deflecting shaft;
   the base has a through hole for receiving the damping disc;
   a main spring, which enables the rocker arm to always have a trend to rotate away from the damping disc, is disposed on the base.

2. The magnetic damping mechanism of claim 1, wherein the main spring is a torsional spring, a compression spring or a tension spring.

3. The magnetic damping mechanism of claim 1, wherein the damping disc is sleeved on the reel shaft through a damping support;
   multiple grooves of different depths are formed on a side surface of the damping support;
   a pin shaft secured on the reel shaft is being inserted to any one of the grooves;
   a first spring, which is resisted against the other end surface of the damping support, is sleeved on the reel shaft so that the damping disc and the damping support is resisted against the pin shaft after moving along the reel shaft in an axial direction.

4. The magnetic damping mechanism of claim 1, wherein the driving member comprises a first driving member and a second driving member;
   the first driving member is connected to the adjustment knob;
   an annular ring having an end surface ascending spirally and an annular groove having a bottom descending spirally is formed on opposite end surfaces of the first driving member and the second driving member, the annular ring and the annular groove are fitted with each other;
   a connecting post, which is connected to the base, is extended from the second driving member; and,
   a second spring, by which the second driving member and the first driving member are always meshed with each other, is sleeved on the connecting post.

5. The magnetic damping mechanism of claim 4, wherein the base is a damping lid, the connecting post passes through a damping holder to be connected to the damping lid, the rocker arm and the magnet are located in a space formed by the damping lid and the damping holder, and the damping holder is secured to the side cover.

6. The magnetic damping mechanism of claim 4, wherein the base is a drum having a U-shaped cross section and an opening facing the damping disc;
   the drum is disposed inside the damping holder;
   the connecting post passes through the damping holder to be connected to the drum;
   the through hole is formed at the opening of the drum;
   the deflecting shaft is disposed on a bottom of the drum;
   the rocker arm and the magnet are disposed inside the drum and distributed on the bottom of the drum.

7. The magnetic damping mechanism of claim 6, wherein a spring seat is disposed at an inside position, corresponding to the other end of the rocker arm, on the bottom of the drum;
   the main spring is a compression spring having two ends respectively connected to the other end of the rocker arm and the spring seat.

8. The magnetic damping mechanism of claim 7, wherein a limiting block, which is fitted with the other end of the rocker arm, is disposed on an inner wall of the drum;
   the movement of the other end of the rocker arm is limited between the limiting block and the spring seat.

9. The magnetic damping mechanism of claim 6, wherein an annular cover plate is secured at the opening of the drum;
   an inner hole on the annular cover plate is the through hole.

10. The magnetic damping mechanism of claim 1, wherein the base is a drum having a U-shaped cross section and an opening facing the damping disc;
    the through hole is formed at the opening of the drum;
    the deflecting shaft is disposed on a bottom of the drum;
    the rocker arm and the magnet are disposed inside the drum and distributed on the bottom of the drum.

11. The magnetic damping mechanism of claim 10, wherein the drum is disposed inside a damping holder;
    the damping holder is secured to the side cover;
    a connecting post, which passes through the damping holder to be connected to the drum, is disposed on the driving member.

12. The magnetic damping mechanism of claim 10, wherein a spring seat is disposed at an inside position, corresponding to the other end of the rocker arm, on the bottom of the drum;
    the main spring is a compression spring having two ends respectively connected to the other end of the rocker arm and the spring seat.

13. The magnetic damping mechanism of claim 10, wherein an annular cover plate is secured at the opening of the drum;
    an inner hole on the annular cover plate is the through hole.

14. The magnetic damping mechanism of claim 13, wherein a first bump in contact with the annular cover plate and a second bump in contact with the bottom of the drum are disposed at the other end of the rocker arm.

15. The magnetic damping mechanism of claim 12, wherein a limiting block, which is fitted with the other end of the rocker arm, is disposed on an inner wall of the drum;
    the movement of the other end of the rocker arm is limited between the limiting block and the spring seat.

16. The magnetic damping mechanism of claim 11, wherein the driving member comprises a first driving member and a second driving member;
    the first driving member is connected to the adjustment knob;
    an annular ring having an end surface ascending spirally and an annular groove having a bottom descending spirally is formed on opposite end surfaces of the first driving member and the second driving member, the annular ring and the annular groove being fitted with each other;
    a connecting post, which is connected to the base, is extended from the second driving member; and,
    a second spring, by which the second driving member and the first driving member are always meshed with each other, is sleeved on the connecting post.

17. The magnetic damping mechanism of claim 1, wherein the base is a damping lid having the through hole in the middle portion.

18. The magnetic damping mechanism of claim 17, wherein multiple magnets, which are distributed at intervals, are provided on each of the rocker arms;
    the magnets on a same rocker arm are successively arranged, at an end facing the damping disc, in terms of polarity N, S, N, S or S, N, S, N.

19. The magnetic damping mechanism of claim 1, wherein multiple rocker arms are evenly distributed on the base along the peripheral direction.

20. The magnetic damping mechanism of claim 19, wherein the pairs of rocker arms are provided with an even number;
    the corresponding magnets on two symmetric rocker arms are arranged, at an end facing the damping disc, in opposite polarity.

* * * * *